UNITED STATES PATENT OFFICE 2,476,027

COPOLYMERS OF BUTADIENE AND TETRAHYDROFURFURYL METHACRYLATE

Albert M. Clifford, Stow, Ohio, assignor to Wingfoot Corporation, Akron, Ohio, a corporation of Delaware No Drawing. Application May 9, 1944, Serial No. 534,820. In Great Britain January 22, 1942

5 Claims. (Cl. 260—83.5)

1

This invention relates to copolymers of tetrahydrofurfuryl methacrylate and butadiene-1,3 having rubber-like properties. More particularly, it relates to copolymers of these substances in such proportions and treated under such conditions as to result in plastic masses having the elasticity characteristic of natural rubber.

Various comonomers have heretofore been polymerized with butadiene-1,3 to yield masses having widely varied properties. It has now been found that rubber-like masses which closely approach natural rubber in some of the more important properties of that material can be prepared by reacting the monomeric substance, tetrahydrofurfuryl methacrylate, with butadiene-1,3. However, in order to secure a material having the desired rubber-like properties, it is necessary that the monomers be reacted in certain proportions and that the polymerization take place in a certain manner. Specifically, the butadiene-1,3 should be present to the extent of 50–80% of the total monomers in the polymerizable mixture and these should be subjected to emulsion polymerization, as contrasted with mass polymerization or polymerization in solvents.

While the invention is more particularly characterized by the employment of tetrahydrofurfuryl methacrylate, having the formula

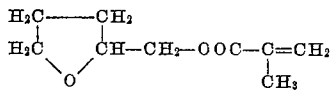

rubber-like copolymers will not be obtained by interpolymerization of this with any and every comonomer. Thus, while butadiene-1,3 may be loosely termed a vinyl compound, it is more specifically a divinyl compound, and it is found that the characteristics of a divinyl compound such as a conjugated diene, particularly butadiene-1,3, and isoprene are those necessary to the production of a satisfactory rubber by copolymerization with tetrahydrofurfuryl methacrylate.

Also, the copolymerization, as mentioned, must be carried on in an aqueous emulsion, since mass polymerization and other methods of polymerization result in hard, inflexible materials, "high polymers" which may even be glass-like in their properties, or indefinite mixtures of polymers with great variation in properties and often characterized by lack of homogeneity. The polymerization is therefore performed in an aqueous medium which contains various ingredients to promote the reaction. These other constituents comprise a catalyst or oxidant, such as sodium perborate or persulphate, an emulsifier, such as

2

Aquarex D (sodium lauryl sulphate plus similar sulphates) and a buffer, such as a solution of disodium phosphate and citric acid (MacIlvaine buffers). Of course, these ingredients may be varied as desired and as described in the prior art in connection with emulsion polymerizations in general. The temperature during polymerization may vary from about 30° C. to about 80° C., or even higher, but is preferably maintained in the neighborhood of 35–50° C. The reaction will be continued for such period of time as will give yields of satisfactory magnitude and of the desired properties. Usually from several hours to a few days may be necessary, the time being controllable to a considerable extent by the addition of promoters, such as acetaldehyde and alkali metal cyanides. The rubber is produced in the form of a latex and this is coagulated by the addition of alcohol, common salt or other well-known coagulant.

To illustrate the practice of the invention, the following example is given, but it will be understood that the invention is not limited to the details thereof.

Example

An aqueous emulsion was made up with the following composition:

| | |
|---|---|
| 5% solution of Aquarex D _____cc__ | 10 |
| MacIlvaine buffer (phosphate-citrate) _cc__ | 10 |
| Sodium perborate _____grams__ | 0.133 |
| Carbon tetrachloride _____do__ | 0.48 |
| Butadiene-1,3 _____do__ | 9.6 |
| Tetrahydrofurfuryl methacrylate __do____ | 6.4 |

The ingredients were charged into four-ounce screw-capped bottles and agitated at a temperature of 50° C. for a period of about 116 hours. At the end of that time the resulting latices were coagulated with denatured ethyl alcohol and were washed and dried. The hydrogen ion concentration of the latex varied in accordance with the buffer which had been added, the disodium phosphate and the citric acid constituents of the buffer being proportioned so as to yield a latex which was, as nearly as possible, of the desired hydrogen ion concentration. It was observed that satisfactory yields of good rubbers were obtained when the hydrogen ion concentration was maintained within the range of about pH 6.5 to 7.3.

It will be noted that, in the foregoing example, the monomers were reacted in the proportions of 60 parts of butadiene-1,3 to 40 parts of tetrahydrofurfuryl methacrylate. Similar results can be obtained when the monomers are reacted in 50-50 proportion and 75-25 proportions of the butadiene and the methacrylate, respectively.

It will be further understood that the butadiene-1,3 is added to the reaction vessel under pressure and that the pressure during the reaction will be that corresponding to the temperature of reaction, but gradually diminishing as the gaseous butadiene compound is consumed in the process. The aqueous emulsion will be agitated constantly during the polymerization to insure complete emulsification and contact between the two monomers and the water-soluble controlling agents of the polymerization.

The rubbers obtained by the practice of the invention are soft and flexible and may be vulcanized into articles with the usual vulcanizing ingredients for natural rubber, or they may include plasticizers, such as dibutyl sebacate, dibutyl phthalate or tricresyl phosphate. Where a plasticizer is employed, the rubbers are softer and may be employed where a soft rubber is required.

This application is a continuation in part of my application Serial No. 452,161, filed July 24, 1942, and now abandoned.

While there has been described above a preferred embodiment of the invention, it will be understood that variations may be made therein without departing from the spirit of the invention or from the scope of the appended claims.

I claim:

1. A rubber-like aqueous emulsion copolymer of 50-80 parts of butadiene-1,3 and 50-20 parts of tetrahydrofurfuryl methacrylate.

2. A rubber-like aqueous emulsion copolymer of 60 parts of butadiene-1,3 and 40 parts of tetrahydrofurfuryl methacrylate.

3. A rubber-like mass which is the solids of a latex from an aqueous emulsion copolymerization of 75 parts of butadiene-1,3 and 25 parts of tetrahydrofurfuryl methacrylate.

4. A method of producing a rubber-like product which comprises heating an aqueous emulsion containing 50-80 parts butadiene-1,3, 50-20 parts of tetrahydrofurfuryl methacrylate and an effective amount of a catalyst capable of polymerizing the mixture at a temperature between 30° C. and 80° C. until the reaction is substantially complete, coagulating the resulting latex and recovering the desired product.

5. A method of producing a rubber-like product which comprises copolymerizing an aqueous emulsion containing 60 parts of butadiene-1,3, 40 parts of tetrahydrofurfuryl methacrylate, an effective amount of sodium perborate as a catalyst, an emulsifier and an amount of buffer to maintain the emulsion at a pH within the range of 6.5-7.3, at a temperature of 50° C. until the reaction is substantially complete, coagulating the resulting latex and recovering the desired product.

ALBERT M. CLIFFORD.

REFERENCES CITED

The following references are of record in the file of this patent:

UNITED STATES PATENTS

| Number | Name | Date |
|---|---|---|
| 2,129,666 | Barrett et al. | Sept. 13, 1938 |
| 2,218,362 | Starkweather | Oct. 15, 1940 |
| 2,232,515 | Arnold et al. | Feb. 18, 1941 |
| 2,279,293 | Clifford | Apr. 14, 1942 |

FOREIGN PATENTS

| Number | Country | Date |
|---|---|---|
| 360,822 | Great Britain | Oct. 30, 1931 |